3. A snap fastening comprising a disc of spring material having a curled-over rim portion and slotted radially to separate said rim portion into independent spring fingers and a stud member having an angularly outstanding flange adapted to be peripherally engaged beneath the curled terminals of the spring fingers.

4. A snap fastening comprising a disc of spring material having a curled-over rim portion and slotted radially to separate said rim portion into independent spring fingers and a stud member having an angularly outstanding marginal flange adapted to be peripherally engaged beneath the curled terminals of the spring fingers, said stud member being in the form of a cupped disc with the rim thereof extended outwardly to provide the outstanding flange.

5. A snap fastening comprising companion members, one having curled-over spring holding fingers at the rim thereof and the other having an angular outstanding flange to be marginally forced between the spring fingers and peripherally engage behind the curled-over terminals thereof, said members having a punched out portion for fastening the same to a garment.

In testimony whereof I affix my signature.

HENRY SPENGLER.